United States Patent [19]

Rozmus

[11] Patent Number: 4,702,357
[45] Date of Patent: Oct. 27, 1987

[54] DRUM BRAKE ADJUSTER

[75] Inventor: Walter J. Rozmus, Port Orange, Fla.

[73] Assignee: Kelsey Hayes Co., Romulus, Mich.

[21] Appl. No.: 763,507

[22] Filed: Aug. 8, 1985

[51] Int. Cl.$^4$ .............................................. F16D 65/56
[52] U.S. Cl. ...................... 188/79.5 GC; 188/196 BA
[58] Field of Search ............... 188/79.5 GC, 79.5 GT, 188/79.5 P, 196 BA

[56] References Cited

U.S. PATENT DOCUMENTS

| | | | |
|---|---|---|---|
| 3,067,840 | 12/1962 | Werner | 188/79.5 GC |
| 3,103,261 | 9/1963 | Borgard | 188/79.5 GC |
| 3,111,200 | 11/1963 | Gores | 188/79.5 GC |
| 3,128,847 | 4/1964 | Swift | 188/79.5 GC |
| 3,221,842 | 12/1965 | Shampton | 188/79.5 GC |

Primary Examiner—Duane A. Reger
Attorney, Agent, or Firm—Ralph J. Skinkiss

[57] ABSTRACT

Disclosed herein is an improved servo brake drum adjustment mechanism which automatically adjusts the brake shoes for wear of the friction pads and drum surface. The mechanism comprises a screw thread adjustment link activated by movement of a pawl finger upon a star wheel. The pawl finger is activated by a wire like push rod. Upon a predetermined circumferential movement of the primary brake shoe the push rod effects rotation of the star wheel and adjustment of the brake shoe assemblies.

6 Claims, 11 Drawing Figures

FORWARD ROTATION

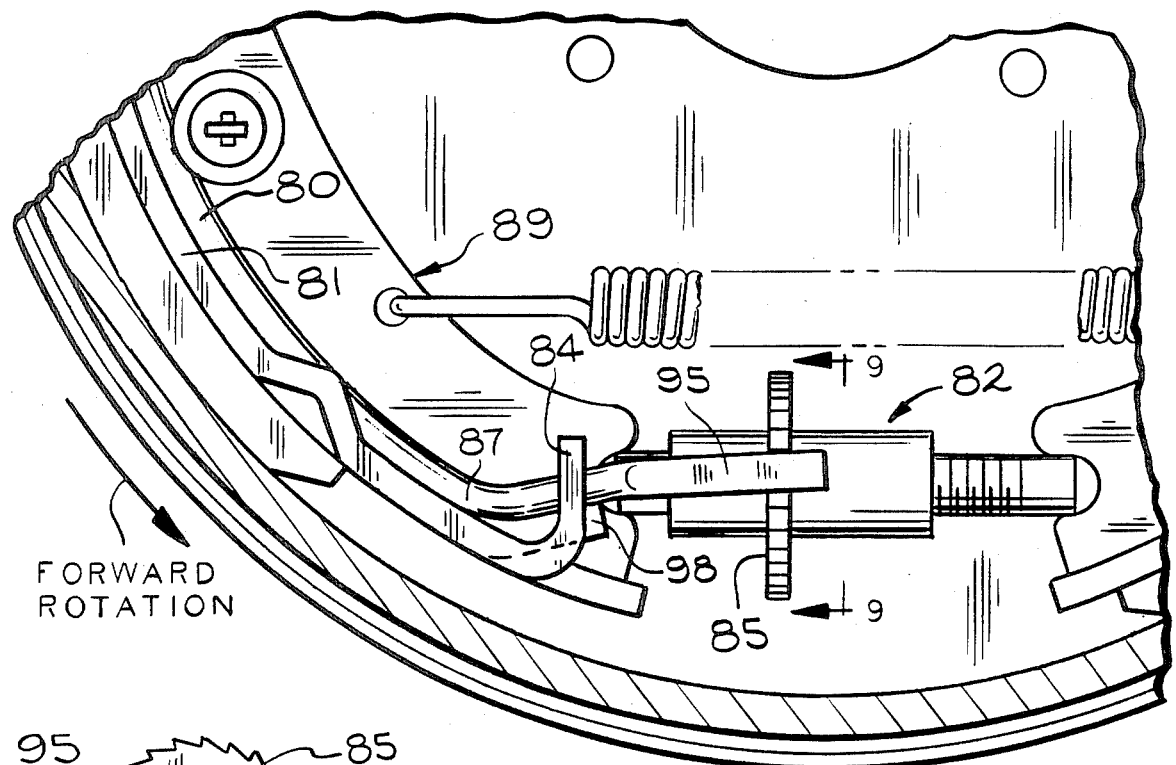
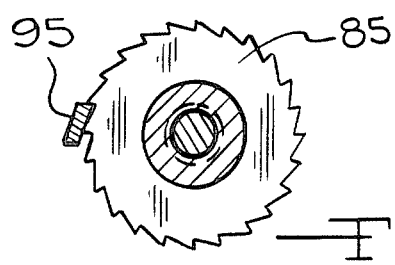
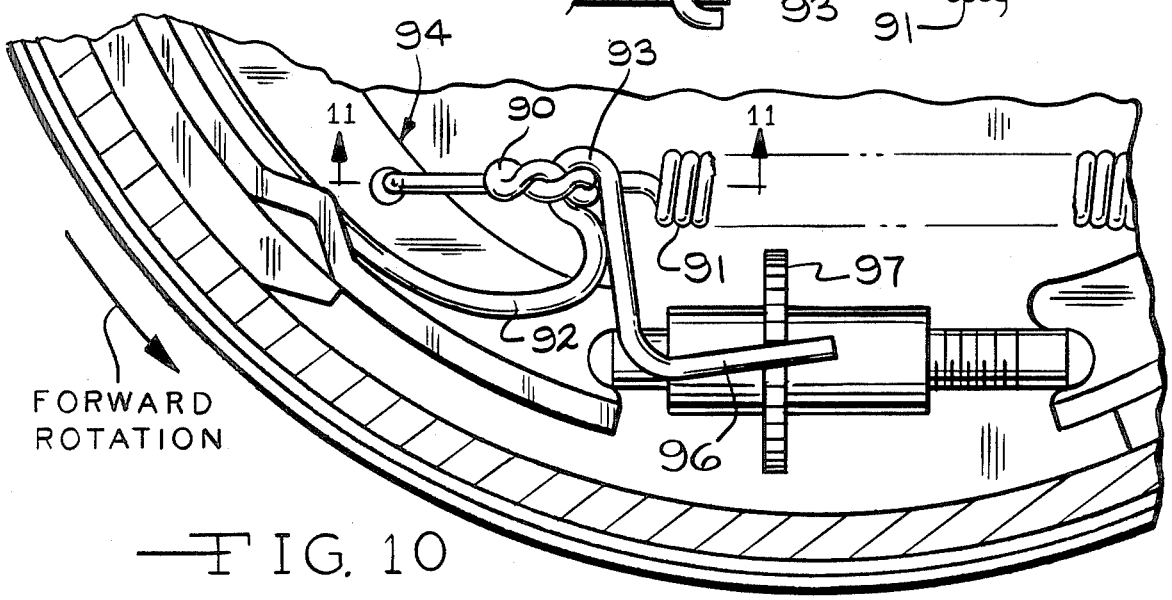

ered only by return spring 19A, is free to move counterclockwise. Thus primary shoe 14A exerts a force upon secondary shoe 14B through adjusting strut 20, thereby serving to increase the effective radial force of friction pad 16B upon rotating drum 11. Upon relaxation of the braking effort return springs 19A and 19B cause retraction of piston rods 12A and 12B into wheel cylinder 15 and in combination with spring 21, return brake shoes 14A and 14B to their normal non applied position.

DRUM BRAKE ADJUSTER

BACKGROUND OF THE INVENTION

The present invention relates to an automatic adjusting mechanism for automotive servo drum brakes. Automatic drum brake adjusters are well known in the art, however, all such adjusters heretofore are complex in both design and operation.

My adjustment mechanism, as taught herein, is relatively simple in design and operation and offers a most economical solution to the servo drum brake application.

SUMMARY OF THE INVENTION

Taught herein is a new, improved, and most simple automatic servo brake adjuster. The adjuster employs a typical star wheel and screw thread adjusting strut to effect adjustment of the brake shoes. The adjusting strut is operated by an arcuate, wire like, push rod, preferably affixed to the anchor pin, and extending in juxtaposed relation to the inside surface of the primary brake shoe table and terminating with a hook-shaped pawl finger anchored to the brake shoe web by a tension link.

Upon application of the brake, circumferential movement of the primary brake shoe causes advancement of the pawl finger over the star wheel proportional to the amount of friction pad and brake drum wear. After a predetermined amount of wear the circumferential movement of the primary brake shoe will cause the pawl finger to index one or more notches upon the star wheel. Release of the brake and return of the primary brake shoe to its non activated position rotates the star wheel thereby increasing the adjuster strut length and adjusting the brake shoes for friction pad and drum wear.

BRIEF DESCRIPTION OF THE DRAWINGS

FIGS. 8 and 9 show an alternate embodiment of my push rod adjuster.

FIGS. 10 and 11 show an alternate means for implementing the push rod adjuster of FIG. 1.

DETAILED DESCRIPTION OF MY INVENTION

Figure 1:
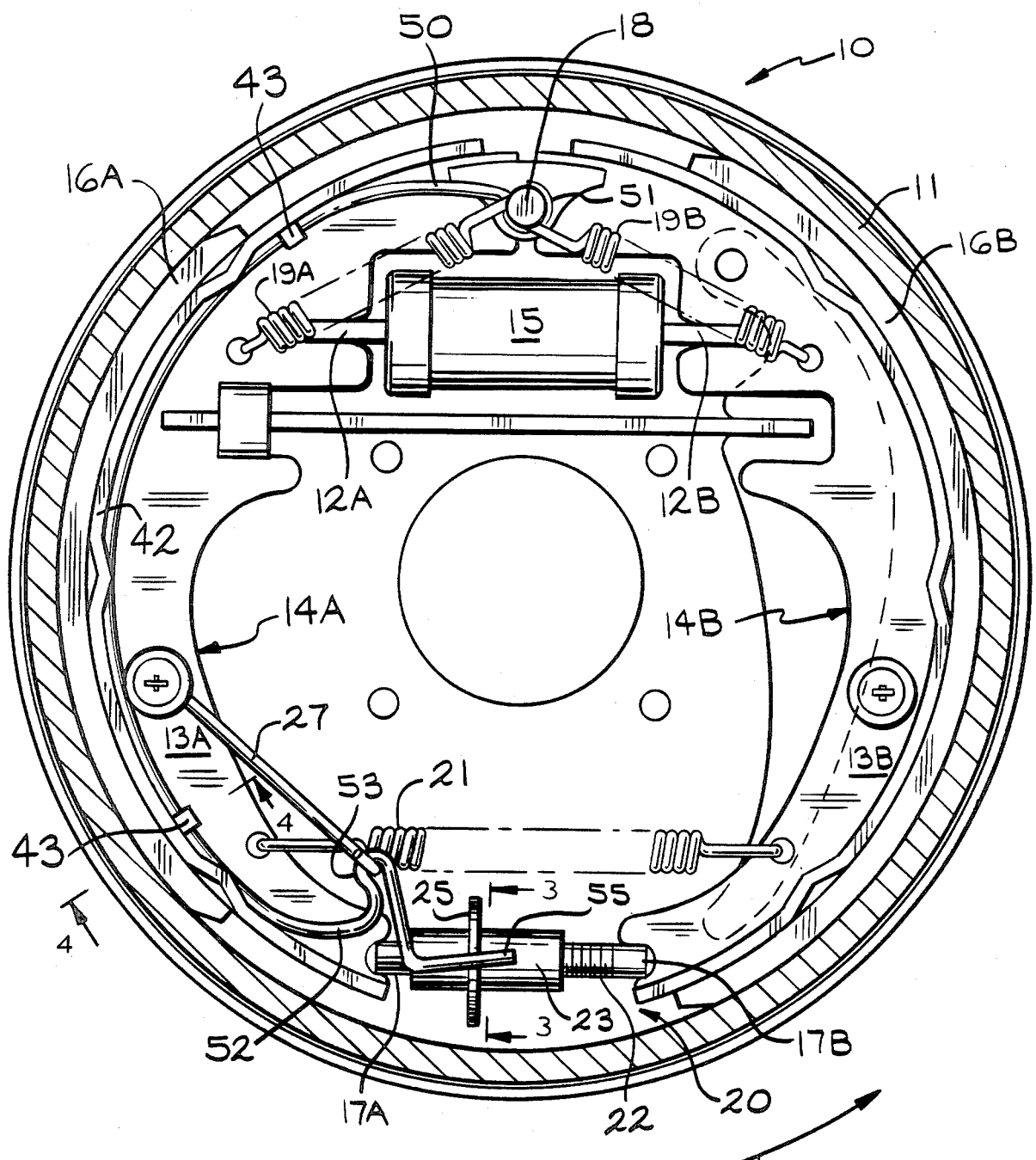
FIG. 1 illustrates a typical servo drum brake assembly embodying my new automatic adjuster.

FIG. 1 illustrates a typical servo drum brake assembly 10 as commonly used on automotive vehicles and represents the brake as may be found on the left side of the vehicle. Thus normal rotation of brake drum 11, during forward movement of the vehicle, is counterclockwise as viewed in FIG. 1.

During normal forward brake activation, hydraulic pressure is supplied to wheel cylinder 15 causing extension of piston rods 12A and 12B. Thus brake shoe assemblies 14A and 14B are urged into frictional engagement with rotating drum 11. As friction pads 16A and 16B engage rotating drum 11, brake shoe assemblies 14A and 14B are frictionally dragged along with drum 11 in a counterclockwise direction. Secondary brake shoe 14B is restricted circumferentially by anchor pin 18. However, primary brake shoe 14A, being restrained only by return spring 19A, is free to move counterclockwise. Thus primary shoe 14A exerts a force upon secondary shoe 14B through adjusting strut 20, thereby serving to increase the effective radial force of friction pad 16B upon rotating drum 11. Upon relaxation of the braking effort return springs 19A and 19B cause retraction of piston rods 12A and 12B into wheel cylinder 15 and in combination with spring 21, return brake shoes 14A and 14B to their normal non applied position.

Having the above basic servo drum brake operating principle in mind and referring to FIGS. 1 through 5, I now describe the element of and the operating principle of my improved brake shoe adjusting mechanism.

Extending between brake shoe web 13A and 13B is adjusting strut 20. As is well known in the art, adjusting strut 20 typically comprises a screw 22 and nut 23 assembly including star wheel 25 which when rotated will cause a change in overall length of strut 20. Each end of the adjusting strut includes a forced end portion, 17A and 17B, which receives the web 13A and 13B of brake shoe, 14A and 14B respectively.

Figure 2:
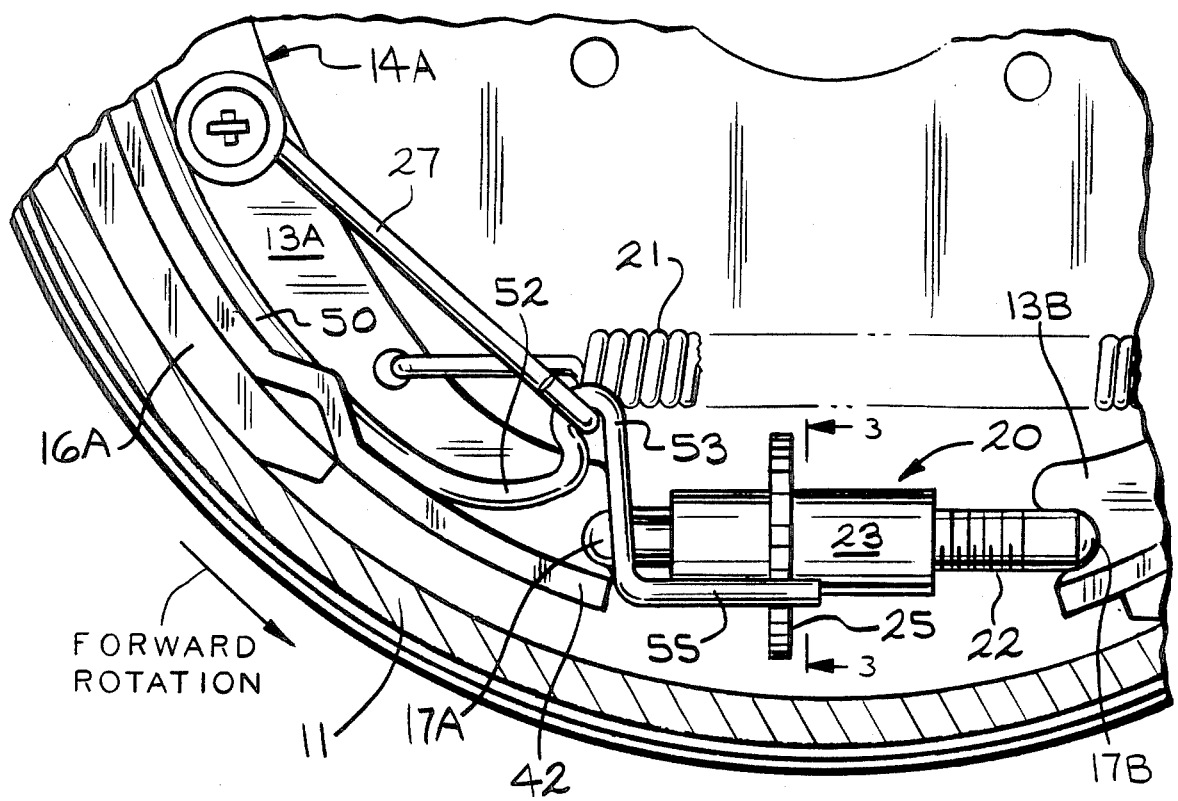
FIG. 2 is an enlarged portion of my drum brake adjuster particularly showing the adjusting finger, tension link and adjusting strut.
Figure 3:
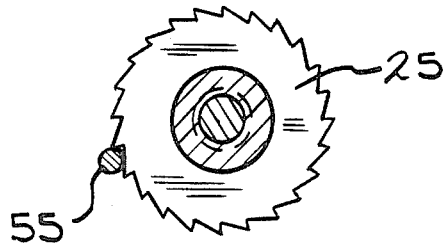
FIG. 3 is a cross-sectional view of the adjusting strut taken along line 3—3 in FIG. 2.
Figure 4:
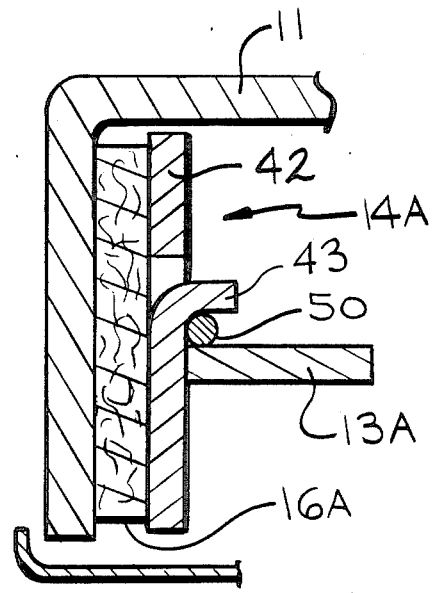
FIG. 4 is a cross-sectional view of the primary brake shoe taken along line 4—4 in FIG. 1.
Figure 5:
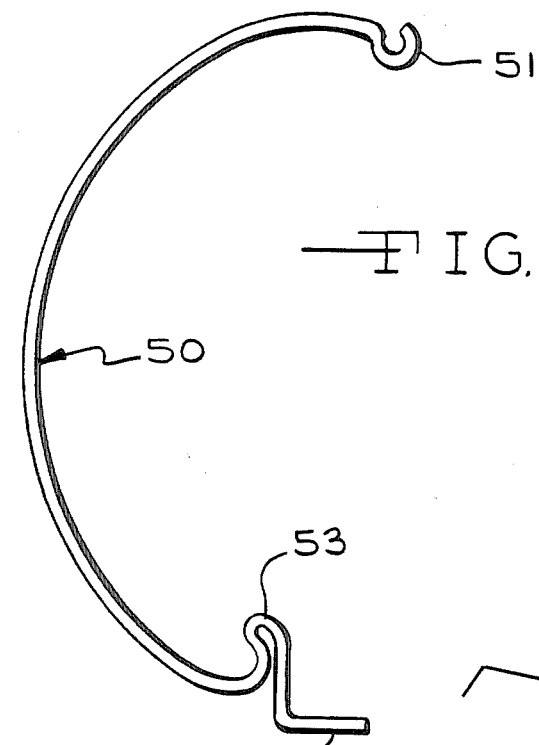
FIG. 5 shows the push rod adjuster element separate from the drum brake assembly.

Affixed to anchor pin 18 by eye 51 is push rod 50. As shown, in FIG. 1 and 4, push rod 50 is in juxtaposed relation to web 13A preferably at the junction of the web and table 42 and held in position by conveniently positioned tangs 43. At the end opposite eye 51 push rod 50 terminates in a combined hook 53 and pawl finger 55 as best illustrated in FIGS. 2 and 5. Preferably push rod 50 is made of spring steel typically used for drum brake return springs and subjected to similar heat treating and processing.

When drum brake 10 is in its non applied mode the push rod pawl finger 55 is held in the position as shown in FIG. 1, relative to star wheel 25, by tension link 27. Tension link 27 engages push rod hook 53 and is conveniently attached to web 13A. In the non applied mode, as shown in FIG. 1, a bending moment is imparted to crook 52 of push rod 50 by the restraining action of tension link 27 upon hook 53.

Upon activation of drum brake 10, as the vehicle is moving forward, primary brake shoe 14A tends to rotate circumferentially in the counterclockwise direction. Counterclockwise movement of brake shoe 14A causes a similar movement of tension link 27. However, since push rod 50 is affixed to anchor post 18 push rod 50 is restrained from movement. Thus hook 53 is caused to move in the general counterclockwise direction thereby causing pawl finger 55 to rotate clockwise, as viewed in FIG. 2, by relaxation of the bending moment imparted to crook 52 by tension link 27.

The degree of circumferential movement of primary brake shoe 14A is primarily a function of the inside diameter of brake drum 11 and the thickness of secondary friction pad 16B. Thus as the friction pads and the brake drum wear the degree of counterclockwise circumferential movement of primary brake shoe 14A increases; thereby effecting proportional increases in the clockwise rotation of pawl finger 55.

Thus the dimensions and geometry of push rod 50, tension link 27, pawl finger 55 and star wheel 25 may be configured such that as the brake drum and friction pads wear to the extent that brake adjustment is desired pawl finger 55 will advance one or more teeth on star wheel 25 when the brake is actuated during forward movement of the vehicle. Upon release of the drum brake and return of primary brake shoe 14A to its original non activated position, tension link 27 also returns to its original position thereby causing counterclockwise rotation of pawl finger 55 to its original position, as shown in FIG. 1, and thereby effecting rotation of star wheel 25 and adjustment of strut 20.

FIGS. 10 and 11 teach an alternate embodiment of my adjuster as shown in FIGS. 1 and 2 wherein the function of tension link 27 is replaced by providing hook 90 as an integral part of spring 91. Hook 90 engages and restrains push rod hook 93 and similar to tension link 27, imparts a bending moment into push rod crook 92.

Similarly as in the embodiment of FIGS. 1 and 2 when the brake is activated, primary shoe 94 is dragged counterclockwise causing spring hook 90 to relax the bending moment imparted to push rod crook 92 thereby causing pawl finger 96 to advance upon star wheel 97.

Figure 7:
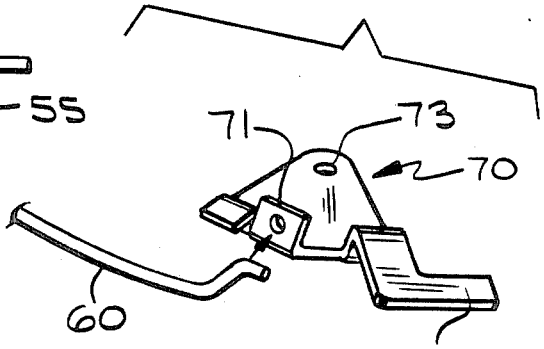
FIG. 7 is a pictorial illustration of the alternate embodiment pawl link.
Figure 6:
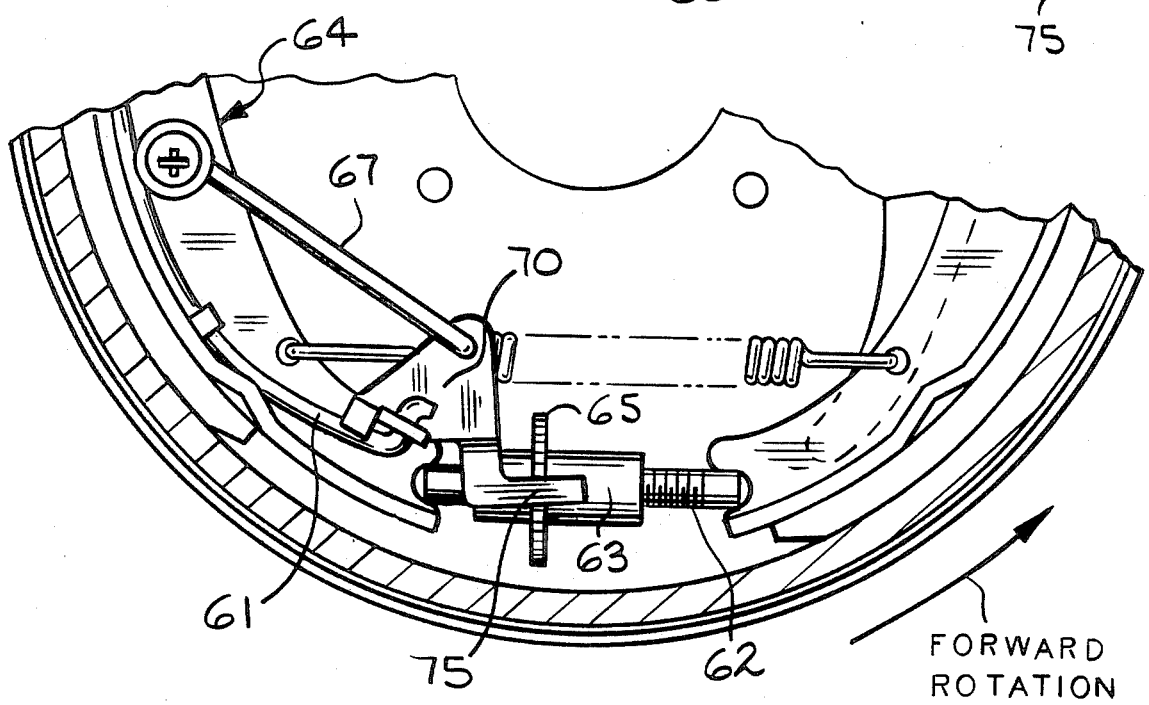
FIG. 6 shows an alternate embodiment of my drum brake adjuster mechanism employing a stamped metal pawl link.

FIGS. 6 and 7 show an alternate embodiment of my new drum brake adjuster wherein the hook 53, and pawl finger 55 of FIGS. 1 and 2 have been replaced by an adjuster link 70 receiving push rod 60 within tang 71 and tension link 67 within eye 73 as shown in FIG. 6. When in the non brake activated mode, as shown in FIG. 6, tension link 67 imparts a bending moment to the lower portion 61 of push rod 60 thus loading or cocking the adjuster link 70 similar to the embodiment shown in FIGS. 1 and 2.

Similarly as in the embodiment of FIGS. 1 and 2 when the brake is activated, primary shoe 64 is dragged counterclockwise causing adjuster link 70 to rotate clockwise, as viewed in FIG. 6, thereby advancing pawl finger 75 upon star wheel 65. Upon relaxation of the brake, adjuster link 70 rotates counterclockwise thus rotating nut 63 causing advancement of screw 62 and hence extension of the adjusting strut.

Another alternate embodiment of my improved drum brake adjuster is shown in FIGS. 8 and 9 wherein the tension link 27, of FIG. 1, has been eliminated. In the alternate embodiment shown in FIGS. 8 and 9, table 81 of primary brake shoe 89 includes ramp 98 upon which pawl finger 95 is supported as shown. Similar to the FIG. 1 embodiment, a bending moment is imparted to crook 87 of push rod 80 by ramp 98. Tang 84 is provided to restrict lateral movement of pawl finger 95 and insure engagement between star wheel 85 and pawl finger 95.

Upon brake activation the primary brake shoe assembly 89 is dragged counterclockwise. As primary shoe 89 moves counterclockwise the corresponding movement of ramp 98 relaxes the bending moment imparted to crook 87 thereby permitting advancement of pawl finger 95 upon star wheel 85. Upon relaxation of the braking effort primary shoe 89 returns to its non activated position thereby causing ramp 98 to return pawl finger 95 to its original non brake activated position. If the combined wear of the brake shoe friction pads and the drum is such that pawl finger 95 advanced one or more teeth upon star wheel 85, the return of pawl finger 95 to its non brake activated position affects rotation of star wheel 85 and extension of adjusting link 82.

It will be appreciated that various changes and modifications may be made in the above described embodiments of the invention without departing from the spirit and the scope of the following claims.

I claim:

1. A servo drum brake assembly comprising:
   a drum;
   a primary and second brake shoe assembly, each brake shoe assembly including an arcuate table, a friction pad affixed to said arcuate table for frictional engagement of said drum, and a web projecting radially inward from said table;
   frame means to which said brake shoe assemblies are affixed and transmit braking torque;
   extensible means engaging the primary and secondary shoe assemblies, said extensible means including a star wheel the rotation of which varies the distance between said assemblies;
   activation means for urging said brake shoe assemblies into frictional engagement with said drum;
   retraction means for returning said brake shoe assemblies to their non activated position upon deactivation of said activation means;
   push rod means in sliding contact with the inside surface of said primary brake shoe arcuate table, said push rod means affixed to said frame means at one end thereof and having pawl means in engagement with said star wheel at its free end;
   means for proportionally advancing said pawl means from its at rest position along the periphery of said star wheel in response to circumferential movement of said primary brake shoe assembly upon activation of said brake and returning said pawl means to its at rest position upon deactivation of said brake.

2. The servo brake drum assembly as claimed in claim 1 wherein said means for proportionally advancing said pawl means comprises means for imparting a localized bending moment to said push rod adjacent said pawl means whereby circumferential movement of said primary brake shoe assembly upon activation of said brake assembly affects relaxation of said bending moment thereby permitting said pawl means to advance along the periphery of said star wheel proportional to the combined wear of said brake shoe assemblies and said drum.

3. The servo brake assembly as claimed in claim 2 wherein the means for imparting a localized bending moment to said push rod adjacent said pawl means comprises ramp means projecting radially inward from the primary brake shoe table, engaging said push rod means.

4. The servo brake assembly as claimed in claim 2 wherein the means for imparting a localized bending moment to said push rod adjacent said pawl means comprises tension link means extending between and engaging the primary brake shoe web and said pawl means.

5. The servo brake assembly as claimed in claim 4 wherein said pawl means comprises an adjuster link affixed to said push rod means having a lever arm affixed to said tension link and a pawl finger extending from said adjuster link and engaging said star wheel.

6. The servo brake assembly as claimed in claim 2 wherein said means for imparting a localized bending moment to said push rod adjacent said pawl means comprises a return spring extending between said primary and secondary brake shoe assemblies.

* * * * *